(12) United States Patent
Nordeen et al.

(10) Patent No.: US 8,807,936 B2
(45) Date of Patent: Aug. 19, 2014

(54) BALANCED TURBINE ROTOR FAN BLADE FOR A TIP TURBINE ENGINE

(75) Inventors: Craig A. Nordeen, Manchester, CT (US); Gabriel L. Suciu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1752 days.

(21) Appl. No.: 11/719,952

(22) PCT Filed: Dec. 1, 2004

(86) PCT No.: PCT/US2004/040124
§ 371 (c)(1),
(2), (4) Date: Dec. 1, 2007

(87) PCT Pub. No.: WO2006/059996
PCT Pub. Date: Jun. 8, 2006

(65) Prior Publication Data
US 2008/0226453 A1 Sep. 18, 2008

(51) Int. Cl.
*F01D 5/18* (2006.01)
*F01D 5/22* (2006.01)
(52) U.S. Cl.
USPC .............. 416/1; 416/90 R; 416/91; 416/191; 415/1; 415/115; 415/16; 60/39.43
(58) Field of Classification Search
USPC ........ 60/39.162, 39.43, 268; 415/1, 115, 116, 415/143; 416/1, 96 R, 96 A, 97 R, 90 R, 91, 416/92, 175, 203, 189–191
See application file for complete search history.

(56) References Cited

U.S. PATENT DOCUMENTS

| | | | |
|---|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |

(Continued)

FOREIGN PATENT DOCUMENTS

| DE | 767704 | 5/1953 |
|---|---|---|
| DE | 765809 | 11/1954 |

(Continued)

OTHER PUBLICATIONS

EP Office Action, dated Mar. 4, 2011.

*Primary Examiner* — Christopher Verdier
(74) *Attorney, Agent, or Firm* — Carlson, Gaskey & Olds, P.C.

(57) ABSTRACT

A fan-turbine rotor assembly for a tip turbine engine includes a multiple of fan blades, which include an inducer section, a hollow fan blade section and a diffuser section. The hollow fan blade section defines an airflow passage. The core airflow is turned, spread and split toward opposite ends of the diffuser section by a multiple of internal turning vanes. The airflow streams are then further turned by discharge turning vanes before discharge from a diffuser discharge outlet. Along with turning and splitting the core airflow, the fan blade profile balances the mass of the diffuser section such that the center of mass thereof is over the hollow airfoil section structure.

37 Claims, 9 Drawing Sheets

(56) References Cited

U.S. PATENT DOCUMENTS

| | | |
|---|---|---|
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,580,943 A * | 4/1986 | Scully ............................ 415/116 |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 5,842,829 A * | 12/1998 | Cunha et al. ................ 415/115 |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| DE | 1301634 | 8/1969 |
| DE | 2361310 | 6/1975 |
| DE | 3333437 | 4/1985 |
| EP | 0661413 | 7/1995 |
| FR | 1033849 | 7/1953 |
| FR | 2566835 | 1/1986 |
| GB | 766728 | 1/1957 |
| GB | 958842 | 5/1964 |
| GB | 1046272 | 10/1966 |
| GB | 1287223 | 8/1972 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059980 | 6/2006 |
| WO | 2006059990 | 6/2006 |
| WO | 2006059996 | 6/2006 |
| WO | 2006060001 | 6/2006 |
| WO | 2006060005 | 6/2006 |
| WO | 2006060009 | 6/2006 |
| WO | 2006060012 | 6/2006 |
| WO | 2006059997 | 11/2006 |
| WO | 2006060003 | 3/2007 |

* cited by examiner

BALANCED TURBINE ROTOR FAN BLADE FOR A TIP TURBINE ENGINE

BACKGROUND OF THE INVENTION

The present invention relates to a tip turbine engine, and more particularly to a hollow fan blade with a diffuser that turns the flow within a constrained radial distance while maintaining a balanced mass.

An aircraft gas turbine engine of the conventional turbofan type generally includes a forward fan, a low pressure compressor, a middle core engine, and an aft low pressure turbine all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor and ignited to form a high energy gas stream. The gas stream flows axially aft to rotatably drive the high pressure turbine which rotatably drives the high pressure compressor through the high spool shaft. The gas stream leaving the high pressure turbine is expanded through the low pressure turbine which rotatably drives the fan and low pressure compressor through a low pressure shaft.

Although highly efficient, conventional turbofan engines operate in an axial flow relationship. The axial flow relationship results in an elongated engine structure of considerable longitudinal length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor and ignited to form a high energy gas stream which drives the turbine integrated onto the tips of the hollow bypass fan blades for rotation therewith as generally disclosed in U.S. Patent Application Publication Nos.: 20030192303; 20030192304; and 20040025490.

The tip turbine engine provides a thrust to weight ratio equivalent to conventional turbofan engines of the same class within a package of significantly shorter length.

The tip turbine engine utilizes hollow fan blades as a centrifugal impeller. Axial airflow from an upstream source such as ambient or an axial compressor must be turned into a radial airflow for introduction into the hollow fan blades. Communicating airflow through the hollow fan blades within a relatively limited radial turning distance of a fan turbine rotor without excessive losses provides an engine design challenge.

Hollow bypass fan blades such as those generally disclosed in U.S. Patent Application Publication Nos.: 20030192303, 20030192304, and 20040025490 may form a mass imbalance about a fan blade outer periphery. During rotational loading, the mass imbalance about the fan blade outer periphery may generate a moment on the fan blade leading to excessive bending stresses.

Accordingly, it is desirable to provide a lightweight hollow fan blade with a core airflow passage which turns an airflow within a minimal radial turning distance without excessive losses while assuring a balanced tip shroud mass.

SUMMARY OF THE INVENTION

The fan-turbine rotor assembly for a tip turbine engine according to the present invention includes a multiple of fan blades which include an inducer section, a hollow fan blade section and a diffuser section. The hollow fan blade section defines a core airflow passage between a first aerodynamic surface mounted to a second aerodynamic surface at a leading edge and a trailing edge to form the fan blade airfoil.

The airflow through the core airflow passage is turned to flow relatively axially by the diffuser section. The core airflow is turned, spread and split into two airflow streams which are ducted toward opposite ends of the diffuser section by a multiple of internal turning vanes. The airflow streams are then further turned by discharge turning vanes before discharge from the diffuser discharge outlet. The flow areas of each adjacent airflow stream are open such that the internal pressure of each adjacent airflow stream will interact with the others allowing flows and pressures to equalize and ensure consistent discharge.

As the core airflow is turned, the aspect ratio of the core airflow is oriented to discharge through an annulus defined by a multitude of diffuser discharge outlets. The diffuser section is positioned relative the fan blade airfoil section so as to locate the diffuser center of mass to minimize the moment on the hollow fan blade segment generated by the rotational force of the annular diffuser. These features result in a "whale tail" diffuser section shape. The diffuser section of each "whale tail" fan blade nests into the shape of the adjacent fan blades to form the complete annular diffuser which maximizes the available diffuser flow area formed from each diffuser discharge outlet such that the radial space required for airflow discharge is minimized.

Along with turning and splitting the core airflow, the fan blade profile of the present invention balances the mass of the diffuser section such that the center of mass thereof is over the hollow fan blade airfoil section structure. Any annular structure mounted about the annular diffuser such as tip turbine blade segments mounted on the outer periphery of the diffuser sections will likewise be so balanced. Centrifugal forces on the diffuser section create only tensile stresses in the hollow fan blade airfoil section which minimizes unacceptable bending stresses and deflections.

The present invention therefore provides a lightweight hollow fan blade with a core airflow passage which turns an airflow within a minimal radial turning distance without excessive losses while assuring a balanced tip shroud mass.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
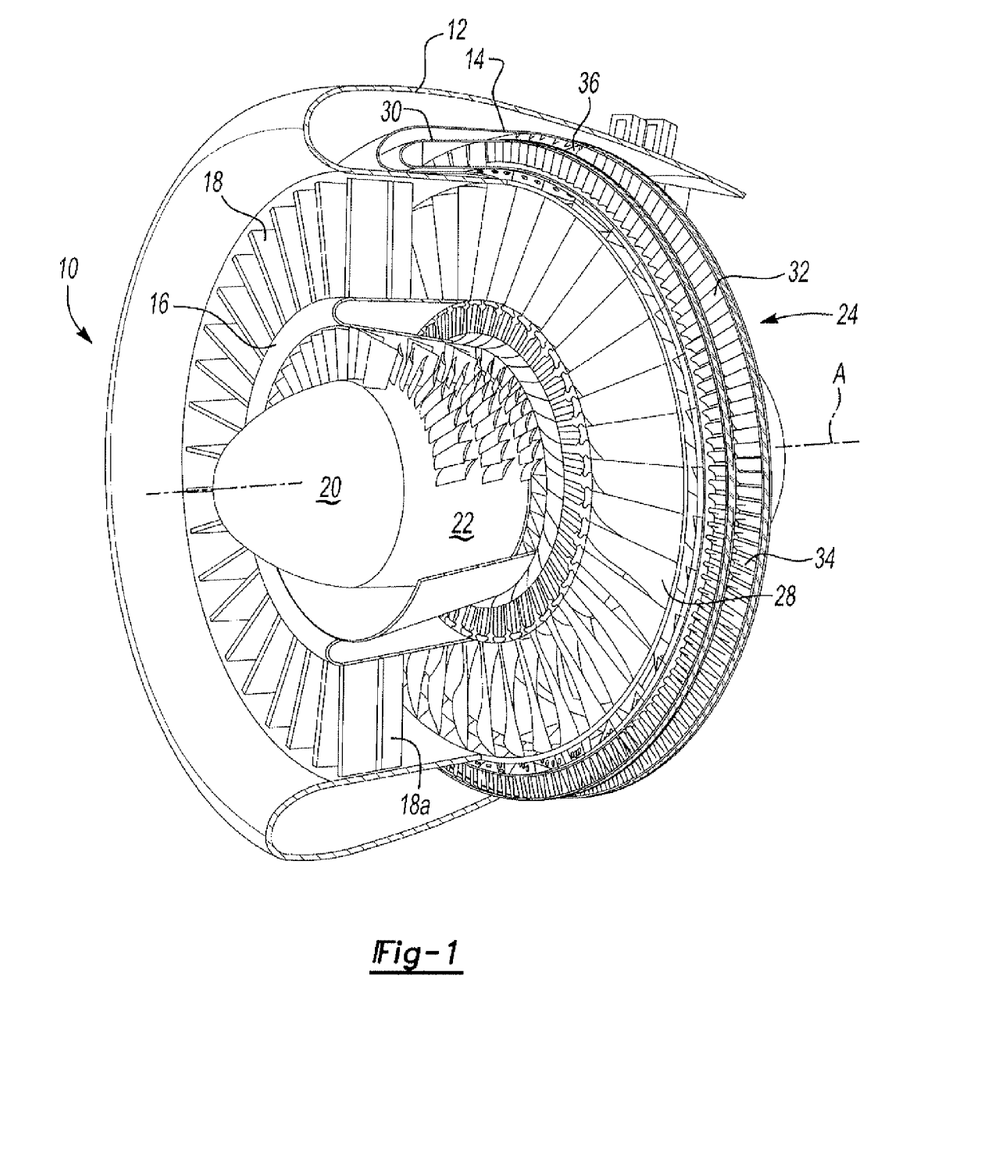
FIG. 1 is a partial sectional perspective view of a tip turbine engine.

FIG. 1 illustrates a general perspective partial sectional view of a tip turbine engine type gas turbine engine 10. The engine 10 includes an outer nacelle 12, a rotationally fixed static outer support structure 14 and a rotationally fixed static inner support structure 16. A multitude of fan inlet guide vanes 18 are mounted between the static outer support structure 14 and the static inner support structure 16. Each inlet guide vane 18 preferably includes a movable trailing edge portion 18A which may be articulated relative to the fixed inlet guide vane 18.

A nose cone 20 is preferably located along the engine centerline A to smoothly direct airflow into an axial compressor 22 adjacent thereto. The axial compressor 22 is mounted about the engine centerline A behind the nose cone 20.

A fan-turbine rotor assembly 24 is mounted for rotation about the engine centerline A aft of the axial compressor 22. The fan-turbine rotor assembly 24 includes a multitude of hollow fan blades 28 to provide internal, centrifugal compression of the compressed airflow from the axial compressor 22 for distribution to an annular combustor 30 located within the rotationally fixed static outer support structure 14. Although two turbine stages are disclosed in the illustrated embodiment, it should be understood that any number of stages may be utilized by the instant invention.

A turbine 32 includes a multitude of tip turbine blades 34 (two stages shown) which rotatably drive the hollow fan blades 28 relative a multitude of tip turbine stators 36 which extend radially inwardly from the static outer support structure 14. The annular combustor 30 is axially forward of the turbine 32 and communicates with the turbine 32.

Figure 2:
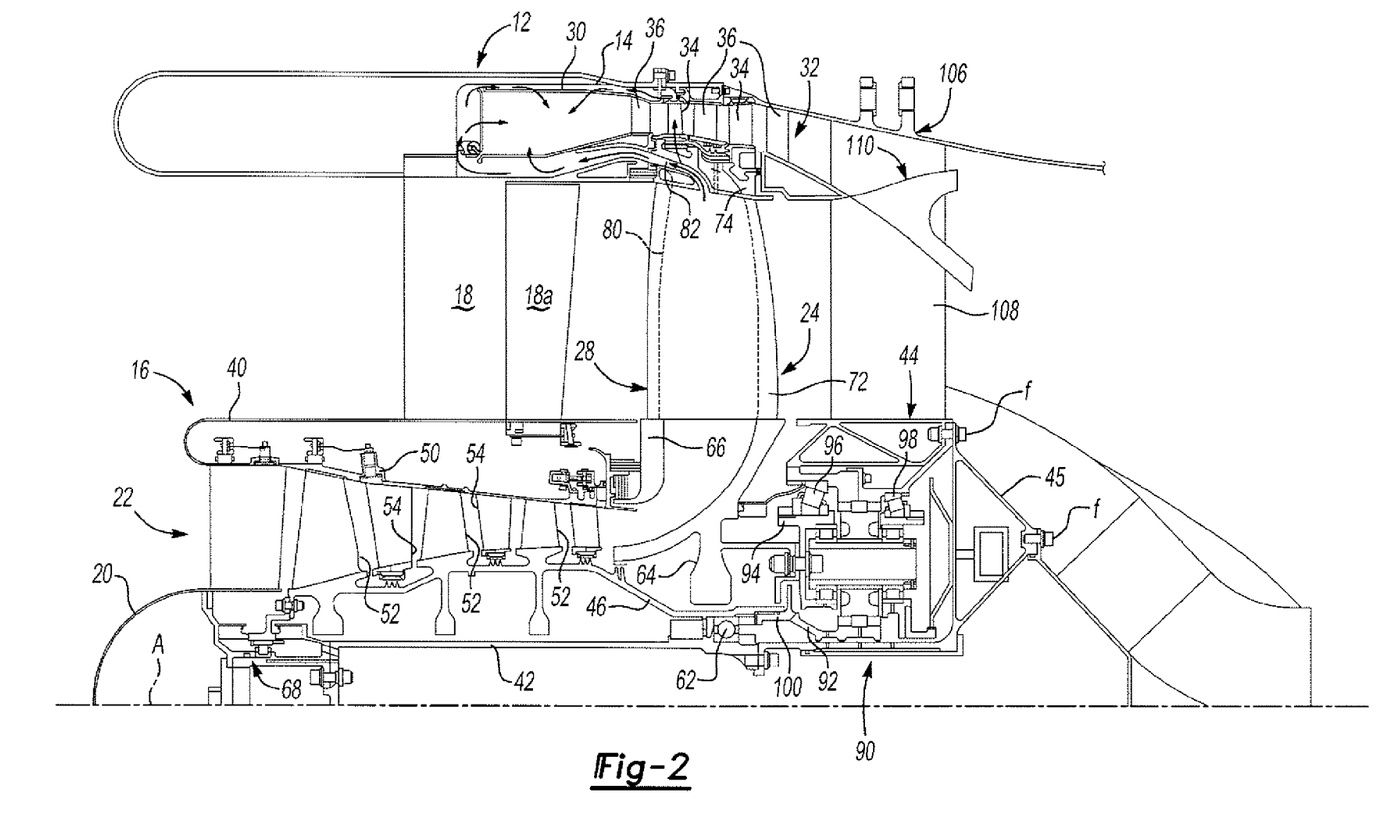
FIG. 2 is a longitudinal sectional view of a tip turbine engine along an engine centerline.

Referring to FIG. 2, the rotationally fixed static inner support structure 16 includes a splitter 40, a static inner support housing 42 and an static outer support housing 44 located coaxial to said engine centerline A. An aft housing 45 is attached to the static inner support housing 42 and the static outer support housing 44 through fasteners f such as bolts or the like. The static inner support housing 42, the static outer support housing 44, and the aft housing 45 are located about the engine centerline A to provide the non-rotating support structure for the engine 10.

The axial compressor 22 includes the axial compressor rotor 46 from which a plurality of compressor blades 52 extend radially outwardly and a compressor case 50 fixedly mounted to the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a multitude of the hollow fan blades 28. Each fan blade 28 includes an inducer section 66, a hollow airfoil section 72 and a diffuser section 74. The inducer section 66 receives airflow from the axial compressor 22 generally parallel to the engine centerline A and turns the airflow from an axial airflow direction (i.e. a first generally axial direction) toward a generally radial airflow direction. The airflow is radially communicated through a core airflow passage 80 within the hollow airfoil section 72 where the airflow is centrifugally compressed. From the core airflow passage 80, the airflow is turned and diffused through an annular diffuser 82 toward an axial airflow direction toward and into the annular combustor 30. Preferably the airflow is diffused axially forward in the engine 10, (i.e., in the opposite direction relative the axial airflow through the axial compressor 22), however, the airflow may alternatively be communicated in another direction.

A gearbox assembly 90 aft of the fan-turbine rotor assembly 24 provides a speed increase between the fan-turbine rotor assembly 24 and the axial compressor 22. Alternatively, the gearbox assembly 90 could provide a speed decrease between the fan-turbine rotor assembly 24 and the axial compressor rotor 46. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably a planetary gearbox that provides co-rotating or counter-rotating rotational engagement between the fan-turbine rotor assembly 24 and an axial compressor rotor 46. The gearbox assembly 90 is mounted for rotation between the sun gear shaft 92 and the static outer support housing 44 through a forward bearing 96 and a rear bearing 98. The forward bearing 96 and the rear bearing 98 are both tapered roller bearings and both handle radial loads. The forward bearing 96 handles the aft axial loads while the rear bearing 98 handles the forward axial loads. The sun gear shaft 92 is rotationally engaged with the axial compressor rotor 46 at a splined interconnection 100 or the like.

In operation, air enters the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused by the diffuser section 74 axially forward in the engine 10 into the annular combustor 30. The compressed core airflow from the hollow fan blades 28 is mixed with fuel in the annular combustor 30 and ignited to form a high-energy gas stream. The high-energy gas stream is expanded over the multitude of tip turbine blades 34 mounted about the outer periphery of the fan-turbine rotor assembly 24 to drive the fan-turbine rotor assembly 24, which in turn drives the axial compressor 22 through the gearbox assembly 90. Concurrent therewith, the fan-turbine rotor assembly 24 discharges fan bypass air axially aft to merge with the core airflow from the turbine 32 in an exhaust case 106. A multitude of outlet guide vanes 108 are located between the static outer support housing 44 and the rotationally fixed static outer support structure 14 to guide the combined airflow out of the engine 10 to provide forward thrust. An exhaust mixer 110 mixes the airflow from the turbine blades 34 with the bypass airflow through the fan blades 28.

Figure 3:
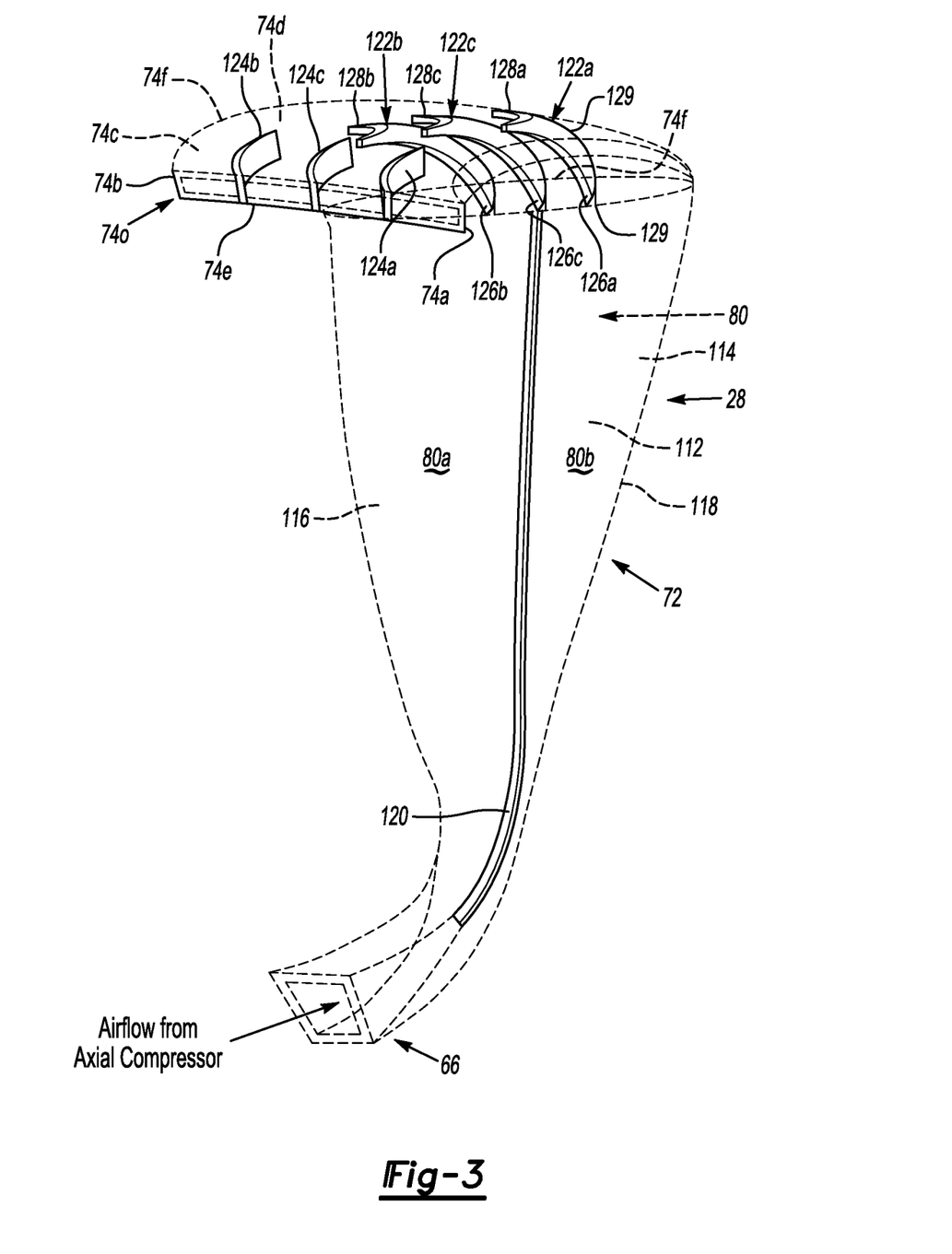
FIG. 3 is a partial phantom view of a fan blade designed according to the present invention.

Referring to FIG. 3, the fan blade 28 includes the inducer section 66, the hollow airfoil section 72 and the diffuser section 74. It should be understood that although the fan blade 28 is described as particular "sections", the fan blade may be partitioned or integrated in various ways while still utilizing the benefits of the present invention.

The inducer section 66 receives airflow from the axial compressor 22 (FIG. 2) and turns the airflow from an axial airflow direction toward a radial airflow direction relative the engine axis A. The airflow is radially communicated through a core airflow passage 80 within the hollow airfoil section 72 where the airflow is centrifugally compressed. The hollow airfoil section 72 defines the core airflow passage 80 between a first airfoil surface 112 attached to a second airfoil surface 114 at a leading edge 116 and a trailing edge 118. The airfoil surfaces 112, 114 form the fan blade airfoil.

Figure 4:
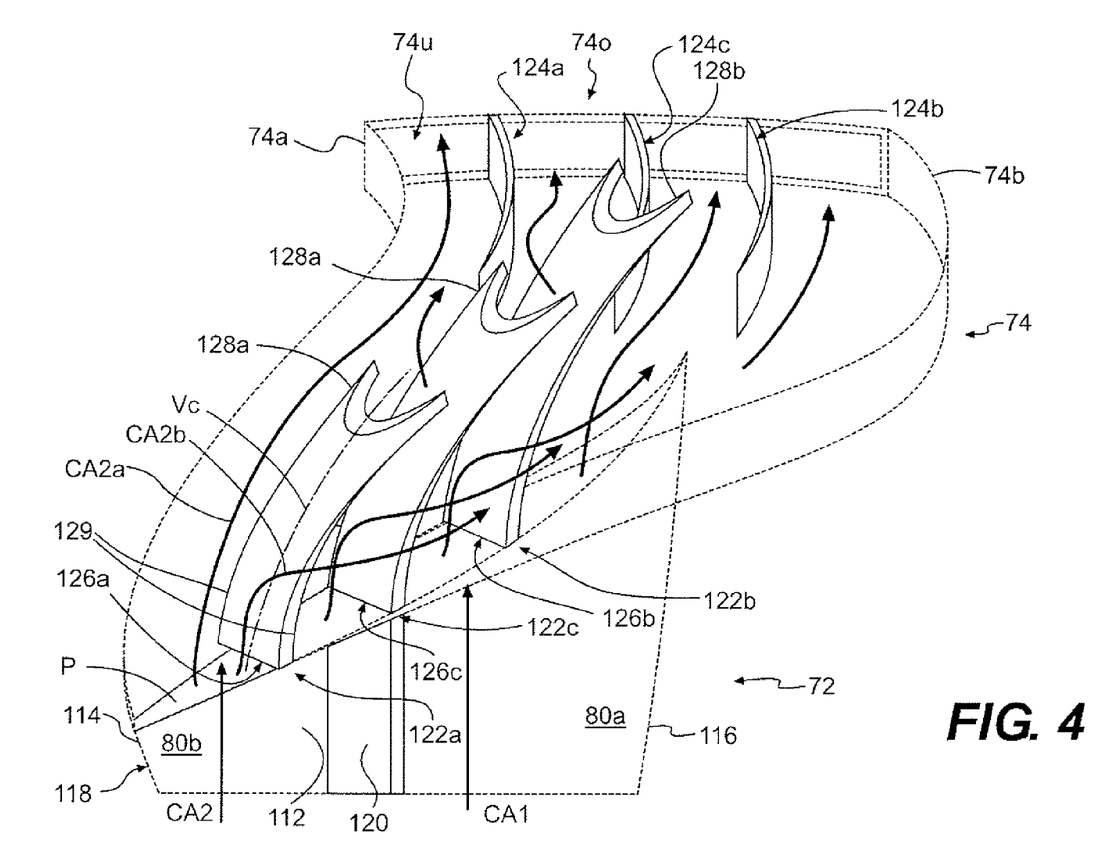
FIG. 4 is an expanded partial top phantom view of a diffuser section of the fan blade designed according to the present invention.

Referring to FIG. 4, the core airflow passage is preferably separated by a longitudinal rib 120. The rib 120 is arranged along a radial flow path of the core airflow passage 80. The core airflow passage 80 is separated into a first core airflow passage 80a and a second core airflow passage 80b by the rib 120 to separate a core airflow CA into a first core airflow stream CA1 and a second core airflow stream CA2. The rib 120 preferably bridges the airfoil surfaces 112, 114 to increase the structural integrity of the fan blade airfoil section 72, however, the rib 120 may alternatively extend from either of the surfaces 112, 114 and be spaced away from the other of the surfaces 112, 114.

The airflow through the core airflow passage 80 is turned to flow relatively axially by the diffuser section 74. The turning scheme that provides a second generally axial flow may be forward or aft (either generally opposite to or in generally in a same direction as the first generally axial flow), however, the fan blade 28 of the present invention will describe an airflow scheme which turns the airflow toward engine forward.

Descriptively starting at the trailing edge 118 of the fan blade 28, the core airflow CA2 is turned, and spread and split into two airflow streams CA2a, CA2b (also illustrated in FIG. 5) which are ducted toward opposite ends 74a, 74b of the diffuser section 74 by a multiple of turning vane 122a-122c. As the two airflow steams CA2a, CA2b are ducted through the diffuser section 74, the streams CA2a, CA2b are further turned by downstream discharge turning vanes 124a-124c that turn the airflow streams again before discharge from the diffuser discharge outlet 74o. Referring to FIGS. 2 and 3, the diffuser section 74 is defined by a shroud 74c that extends axially aft from the airfoil section 72 and encloses a multiple discharge turning vanes 124a-c and a multiple of turning vanes 122a-122c. The leading edge 126a-126c of each turning vane 122a-122c is located at the interface between the hollow fan blade airflow section 72 and the diffuser section 74 as represented by separation plane P as will be discussed infra. The diffuser section shroud 74c overhangs the airfoil section even though the diffuser section center of mass does not (see FIG. 5). The shroud 74c has a top side 74d and bottom side 74e and two side sections 74f contacting and blending into the top side 74d and the bottom side 74e so that the shroud 74c encloses the turning vanes 124a-c and a multiple of turning vane 122a-122c. The top side 74d and the bottom side 74e both contact the multiple of turning vanes 124a-c and a multiple of turning vane 122a-122c Each airflow is turned by a leading edge 126a-126c of the turning vanes 122a-122c then split by the turning vanes 122a-122c forward of the airflow segment. It should be understood that airflow "segment" is merely a naming convention for descriptive purposes and that the airflow through core airflow passage 80 is generally uniform. Furthermore, although two core airflow passages 80a, 80b are defined by rib 120, it should be further understood that any number of passages as well as a single passage may also be utilized by the present invention. Each successive airflow segment is similar turned and split. The airflow segment along the fan blade leading edge 116 is not split but turned and directed to a middle portion of the diffuser section 74. The discharge turning vane 124c is preferably located centrally within the diffuser discharge outlet 74o upstream of the turbine vanes 122a-122c.

The flow areas are open such that the internal pressure of each adjacent airflow segment will interact with the others allowing flows and pressures to equalize and insure a generally consistent discharge from the diffuser discharge outlet 74o.

Figure 6:
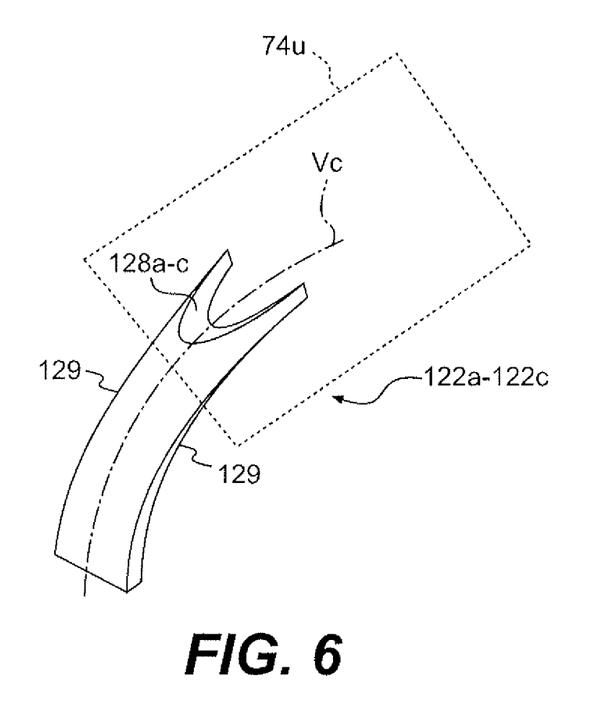
FIG. 6 is an expanded view of the turning vanes within the diffuser section.

The shape of each surface of the internal turning vanes 122a-122c is tailored for turning and splitting the airflow. The leading edge 126a-126c of each turning vane 122a-122c is located at the interface between the hollow fan blade airflow section 72 and the diffuser section 74 as represented by separation plane P. The leading edge 126a-126c of each turning vane 122a-122c is relatively flat and parallel to the rib 120 (also illustrated in FIG. 3). Each turning vane 122a-122c transits the diffuser section 74 in an arcuate manner (FIG. 3). As each turning vane 122a-122c transits the diffuser section 74, the longitudinal sides 129 of each turning vane 122a-122c are progressively folded inward toward a centerline Vc (FIG. 6) of each turning vane 122a-122c such that a trailing edge 128a-128c forms a generally V-shape where the trailing edge 130a-130c intersects with an upper surface 74U (also illustrated in FIG. 6) of the diffuser section 74. That is, the internal turning vanes 122a-122c first turn the core airflow CA with the leading edge 126a-126c then split the core airflow CA toward opposite ends 74a, 74b of the diffuser section 74 as the core airflow reaches the upper surface 74U.

Figure 7:
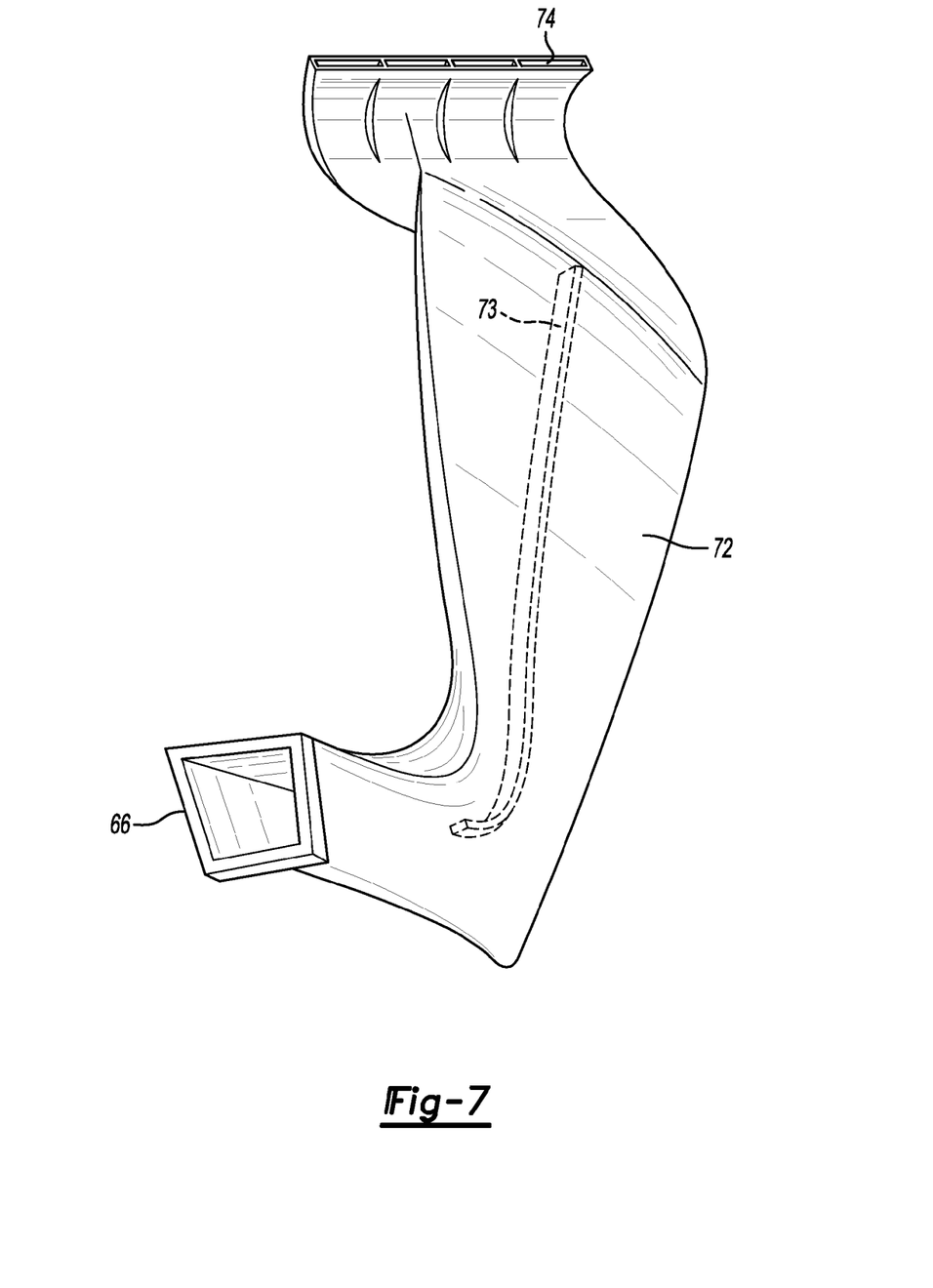
FIG. 7 is a front view of a fan blade designed according to the present invention.
Figure 8:
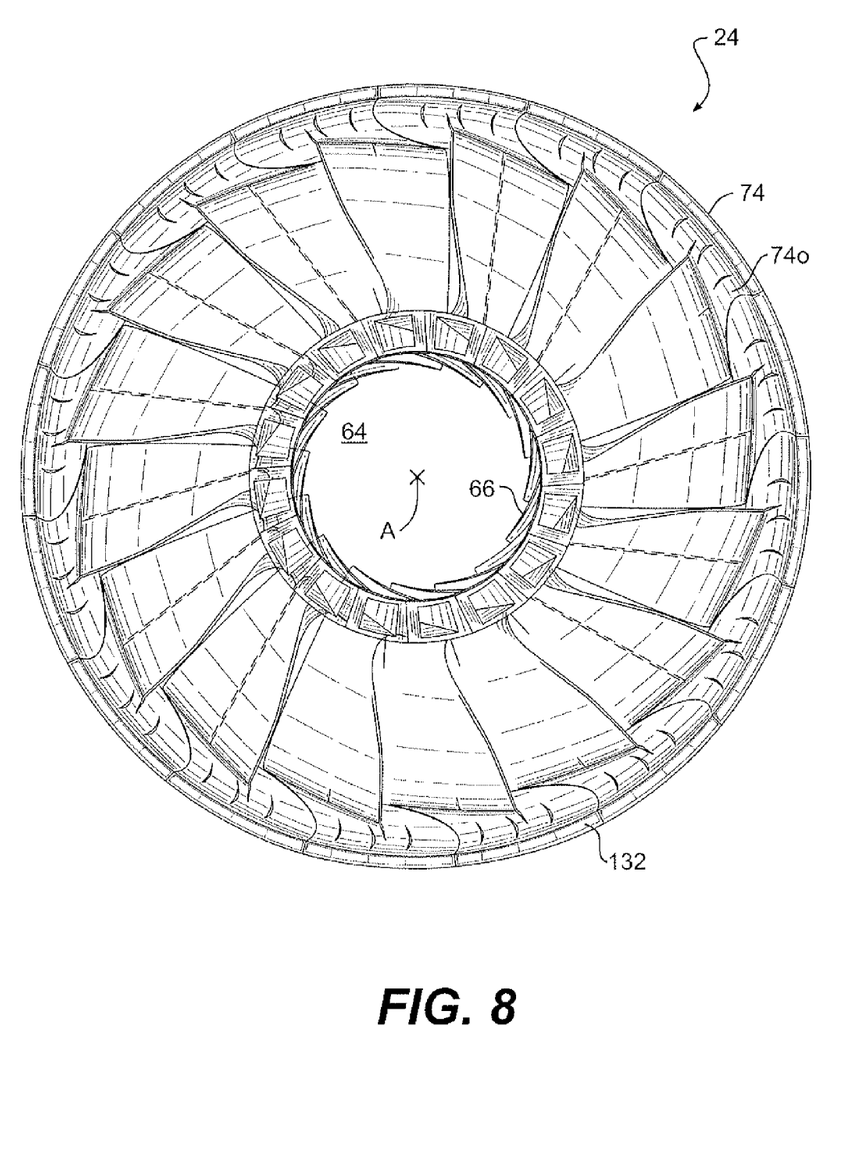
FIG. 8 is a front view of a multitude of individual fan blade as nested together within a fan-turbine rotor hub assembly.

As the core airflow CA is turned, the aspect ratio of the core airflow is oriented to discharge through an annulus defined by the diffuser discharge outlet 74o. At the same time, the diffuser section 74 is positioned on top of the fan blade airfoil section 72 so as to locate the diffuser section center of mass to minimize the moment on the hollow fan blade segment generated by the rotational force of the diffuser 74. These features result in a "whale tail" shape (FIG. 7). This shape is further defined by the requirement of angular repetition for each blade. That is, the diffuser section 74 of each "whale tail" fan blade 28 nests into the shape of the adjacent fan blades to form a complete annular diffuser 132 (FIG. 8). Nesting maximizes the available diffuser flow area formed from each diffuser discharge outlet 74o such that the radial space required for airflow discharge is minimized.

Figure 9:
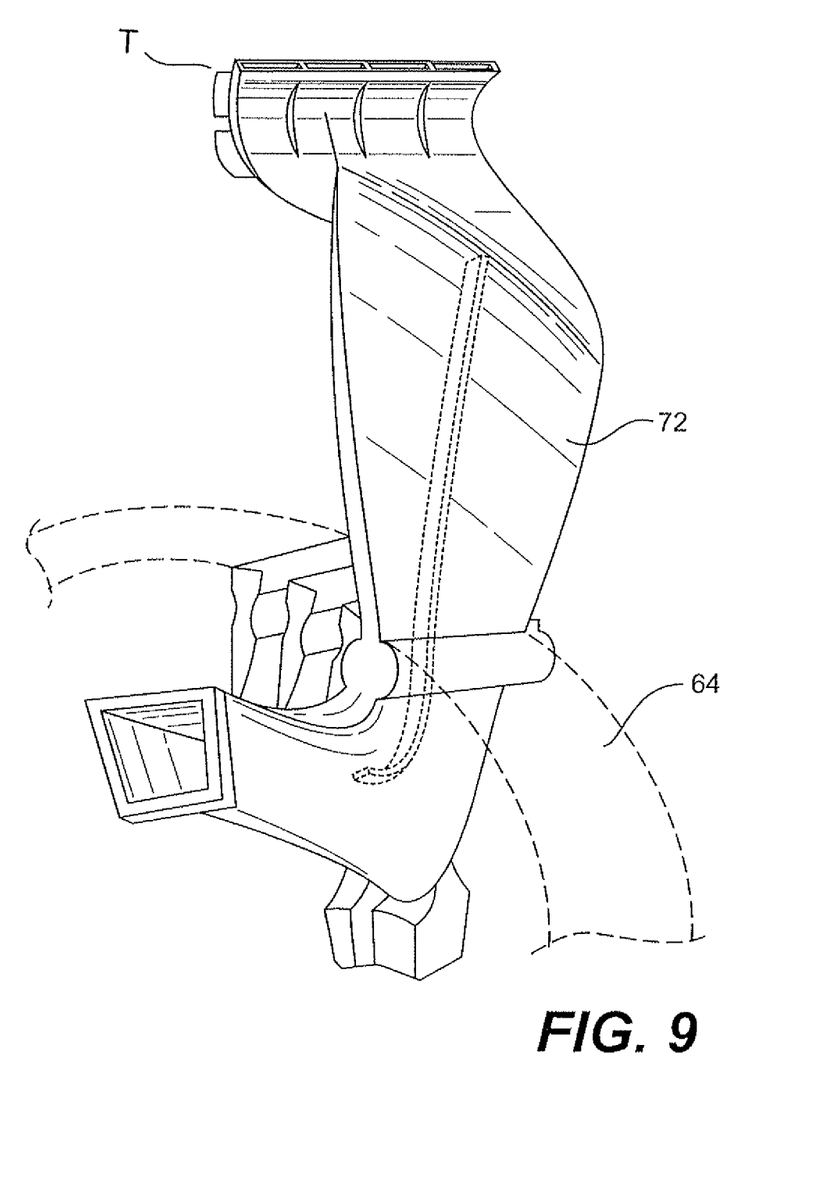
FIG. 9 is a partial phantom view of a fan blade with a tip structure according to the present invention.

Any number of the turning vane 122a-122b and the discharge turning vanes 124a-124c may be used with the present invention. Both turning vane 122a-122b and the discharge turning vanes 124a-124c may serve a structural function of the diffuser section 74 as with rib 120. The radial structure of the turning vane 122a-122b and the discharge turning vanes 124a-124c further provide radial load paths through the fan blade 28 to provide further support for tip structures T mounted to the diffuser section 74 such as tip turbine blade segments mounted on an outer periphery thereof (FIG. 9).

Along with turning and splitting the core airflow CA, the fan blade 28 profile of the present invention balances the mass of the diffuser section 74 such that the center of mass thereof (FIG. 5) is balanced over the hollow airfoil section 72 structure. Any annular structure such as tip turbine blade segments mounted on the outer periphery of the diffuser sections 74 thereof (FIG. 9) will likewise be so balanced. The centrifugal forces on the diffuser section 74 create tensile stresses in the hollow airfoil section 72. Minimal overturning moment and minimal unacceptable bending stresses and deflections in the blade are thereby assured. Furthermore, because the blades 28 are separate entities, the resulting load is not transferred to adjoining blades creating a possible unbalance and resulting stress and deflection. This is particularly advantageous for relatively larger TTEs.

Figure 5:
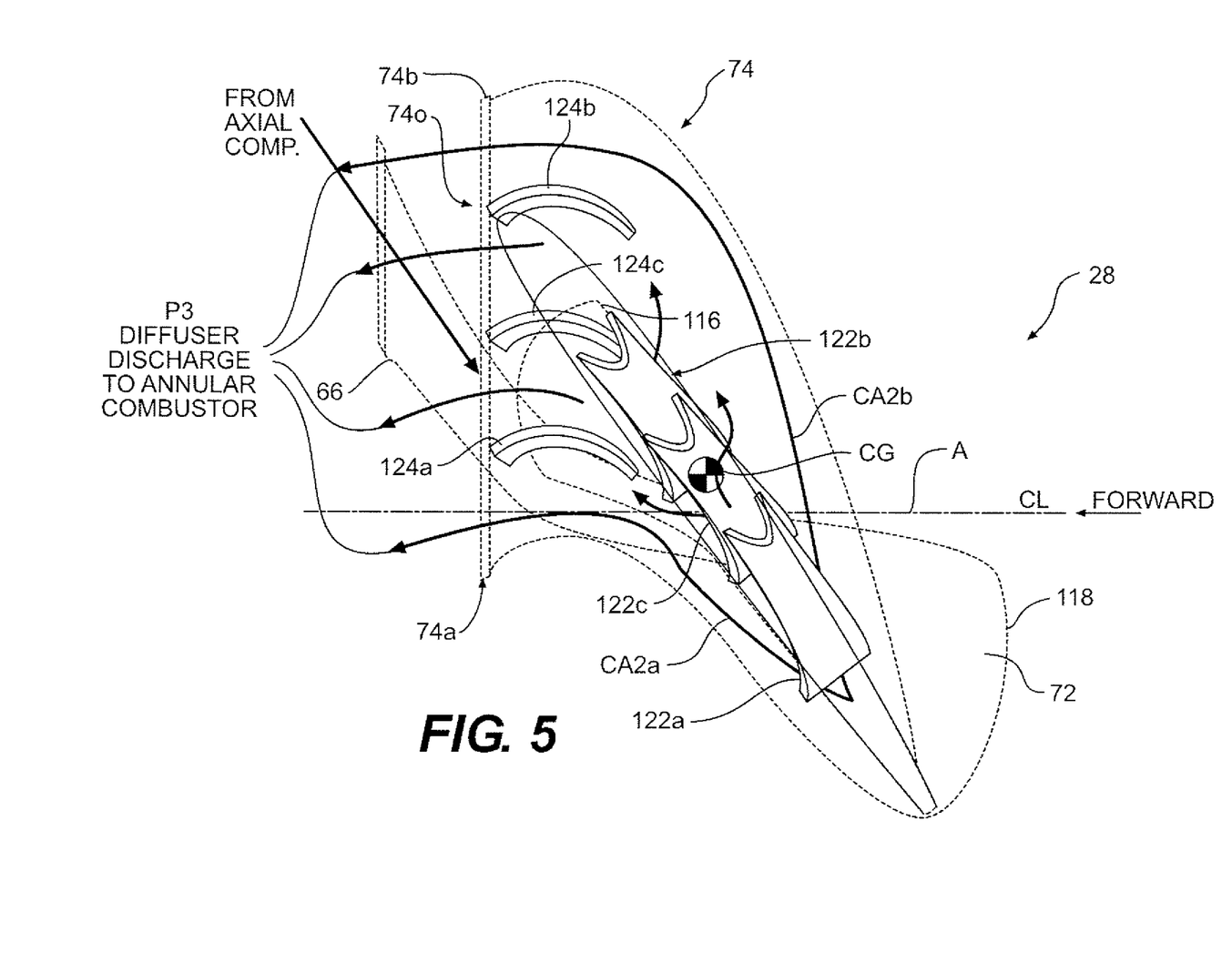
FIG. 5 is a top phantom view of a fan blade designed according to the present invention.

Referring to FIG. 5, the center of mass of the diffuser section 74 does not overhang the hollow airfoil section 72 structure as viewed from looking straight down along a line connecting the center of mass with the engine centerline A. In other words, if the blade 28 were stood upon the inducer section 66 such that the diffuser center of mass was connected vertically to the engine centerline a, and the diffuser section 74 was severed from the hollow fan blade airfoil section 74 then placed back in its original position, the diffuser section 74 will remain balanced thereon because the diffuser section 74 center of mass is located directly over the fan blade airfoil section 74. Conversely, if the center of mass was not over the fan blade airfoil section 72, an overturning moment would be formed and the diffuser section would "fall off" because it is not equally balanced thereon. These forces, in this hypothetical case, are opposite to the centrifugal forces in actual operation but the notion is similar. In operation, the centrifugal forces of an unbalanced diffuser would create a twisting force (the overturning moment) and the fan blade would bend unacceptably.

As indicated from the description hereinabove, a method of communicating an airflow through a fan blade includes the steps of (1) communicating an airflow through an airflow passage within an airfoil of the fan blade rotatable about an axis of rotation, the airflow passage having an inducer section to receive the airflow from a first generally axial direction and turn the airflow to a first generally radial direction; and (2) turning within a diffuser section located radially outboard of the airfoil section in which air is diffused and splitting the airflow from the airflow passage within the airfoil, the diffuser section having a diffuser section center of mass positioned over the airfoil section, the diffuser section oriented to turn and split the airflow from the generally radial direction to a second generally axial direction, the second axial airflow direction generally opposite the first generally axial direction.

As indicated from the description hereinabove, step (2) further includes splitting the airflow within the airfoil toward opposite ends of the diffuser section. Step (2) further includes equalizing the internal pressure of the airflow through the diffuser section to provide a constant discharge from a diffuser discharge outlet. The method further includes the step of generating only tensile stresses in an airfoil section of the fan blade from a centrifugal force exerted upon the diffuser section.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A fan blade comprising:
an airfoil section for rotation about an axis of rotation which defines an airflow passage therethrough, said airflow passage having an inducer section to receive an airflow from a first axial direction and turn said airflow to a radial direction;
a diffuser section, within which air is diffused in communication with said airflow passage, wherein said diffuser section is radially outboard of said airfoil section, said diffuser section having a diffuser section center of mass positioned directly over said airfoil section, said diffuser section oriented to turn and split said airflow from said radial direction to a second axial direction, said second axial direction being substantially opposite said first axial direction; and
a turning vane within said diffuser section, said turning vane within said diffuser section turning said airflow from a radial direction to said second axial direction.

2. The fan blade as recited in claim 1, wherein said diffuser section center of mass does not overhang said airfoil section.

3. The fan blade assembly as recited in claim 1, wherein said turning vane has a relatively flat leading edge and a V-shape trailing edge.

4. The fan blade assembly as recited in claim 3, wherein said turning vane transits said diffuser section along an arcuate path.

5. The fan blade assembly as recited in claim 3, wherein said V-shape trailing edge intersects a diffuser upper surface of said diffuser section.

6. The fan blade assembly as recited in claim 1, wherein said turning vane has a first and second longitudinal side each side of which is progressively folded inward toward a centerline of said turning vane such that a trailing edge of said turning vane forms a V-shape where said trailing edge intersects with an upper surface of said diffuser section.

7. The fan blade as recited in claim 1, wherein said airfoil section and said diffuser section form a whale tail shape.

8. The fan blade as recited in claim 1, further comprising a discharge turning vane within said diffuser section adjacent a diffuser discharge outlet.

9. The fan blade as recited in claim 1, further comprising a rib formed within said airflow passage within said airfoil section wherein said turning vane has a leading edge adjacent said rib wherein said rib segments said airflow in said airfoil section into more than one airflow in said diffuser.

10. The fan blade of claim 1 wherein said diffuser section includes a second turning vane downstream of said turning vane, said second turning vane turning said airflow within said second axial direction.

11. The fan blade as recited in claim 1, wherein the first direction is an axially aft direction, and wherein the second direction is an axially forward direction.

12. A fan-turbine rotor assembly for a tip turbine engine comprising:
a multitude of fan blades for rotation about an axis of rotation, each of said multitude of fan blades having an airfoil section, an inducer section, and a diffuser section, said airfoil section defining an airflow passage therethrough;
said inducer section in communication with an inlet to said airflow passage to receive an airflow from a first axial direction and turn said airflow to a radial direction;
said diffuser section in which air is diffused in communication with an outlet from said airflow passage radially outboard of said airfoil section, said diffuser section having a diffuser section center of mass positioned over said airfoil section, said diffuser section nested into an adjacent diffuser section such that said multitude of fan blades form an annular diffuser, each of said diffuser sections oriented to turn and split said airflow from said radial direction to a second axial direction; and
a turning vane within said diffuser section, wherein said turning vane includes a first and second longitudinal side each side of which is progressively folded inward toward a centerline of said turning vane such that a trailing edge of said turning vane forms a V-shape where said trailing edge intersects with an upper surface of said diffuser section.

13. The fan-turbine rotor assembly as recited in claim 12, further comprising a discharge turning vane within said diffuser section adjacent a diffuser discharge outlet.

14. The fan turbine rotor assembly as recited in claim 12, wherein said diffuser section expels said airflow primarily in said second axial direction, wherein said second axial direction is different than said first axial direction.

15. The fan turbine rotor assembly as recited in claim 14, wherein said first axial direction is opposite said second axial direction.

16. A method of communicating an airflow through a fan blade comprising the steps of:
   (1) communicating said airflow through an airflow passage within an airfoil of said fan blade rotatable about an axis of rotation, said airflow passage having an inducer section to receive said airflow from a first axial direction and turn said airflow to a first radial direction; and
   (2) turning, within a diffuser section in which air is diffused located radially outboard of an airfoil section, and splitting the airflow from the airflow passage within said airfoil, the diffuser section having a diffuser section center of mass positioned over said airfoil section, said diffuser section oriented to turn and split said airflow from said radial direction to a second axial direction and toward opposite ends of the diffuser section, the second axial airflow direction opposite the first axial direction.

17. A method as recited in claim 16, wherein said step (2) further comprises:
   equalizing the internal pressure of the airflow through the diffuser section to provide a constant discharge from a diffuser discharge outlet.

18. A method as recited in claim 16, further comprising the step of:
   generating only tensile stresses in said airfoil section of said fan blade from a centrifugal force exerted upon the diffuser section.

19. A fan blade comprising:
   a turning vane located within a diffuser of said fan blade with a first and second longitudinal side each side of which is progressively folded inward toward a centerline of said turning vane such that a trailing edge of said turning vane forms a generally V-shape where said trailing edge intersects with an upper surface of a diffuser section.

20. The fan blade as recited in claim 19, wherein a discharge turning vane is disposed within said diffuser section adjacent a diffuser discharge outlet.

21. The fan blade as recited in claim 19, further comprising a rib formed within an airflow passage in communication with said diffuser section and an inducer section, said inducer section to receive an airflow and said diffuser section to expel said airflow.

22. The fan blade as recited in claim 21, wherein said turning vane locates a leading edge adjacent said rib.

23. The fan blade as recited in claim 19, further comprising a multitude of turning vanes sequentially arranged along an airflow passage in communication with said diffuser section.

24. The fan blade as recited in claim 19, further comprising a multitude of discharge turning vanes in communication within said diffuser section adjacent a diffuser discharge outlet.

25. A fan blade comprising:
   an airfoil section for rotation about an axis of rotation which defines an airflow passage therethrough, said airflow passage having an inducer section to receive an airflow from a first generally axial direction and turn said airflow to a generally radial direction;
   a diffuser section in communication with said airflow passage, said diffuser section having a diffuser section center of mass positioned directly over said airfoil section, said diffuser section oriented to turn and split said airflow from said generally radial direction to a second generally axial direction: and,
   a turning vane within said diffuser section wherein said turning vane has a relatively flat leading edge and a generally V-shape trailing edge.

26. A fan blade comprising:
   an airfoil section for rotation about a first axis, said airfoil section defines an airflow passage therethrough, said airflow passage having an inducer section to receive an airflow from a first axial direction and turn said airflow to a radial direction;
   a diffuser section receiving airflow from said airflow passage, said diffuser section disposed radially outwardly from said airfoil section and within which said airflow is diffused, said diffuser section enclosed by a shroud extending in a second axial direction from said airfoil section, said second axial direction being substantially opposite said first axial direction, said diffuser section oriented to turn said airflow from said radial direction to said second axial direction; and
   a first turning vane within said shroud, said turning vane turning said airflow from a radial direction to said second axial direction.

27. The fan blade of claim 26 wherein said diffuser section has a diffuser section center of mass positioned directly over said airfoil section.

28. The fan blade as recited in claim 27, wherein said diffuser section center of mass does not overhang said airfoil section.

29. The fan blade assembly as recited in claim 28, wherein said diffuser section shroud overhangs said airfoil section.

30. The fan blade assembly as recited in claim 26, wherein said first turning vane has a relatively flat leading edge and a V-shape trailing edge.

31. The fan blade assembly as recited in claim 30, wherein said V-shape trailing edge intersects a diffuser upper surface of said diffuser section.

32. The fan blade assembly as recited in claim 30, wherein said first turning vane contacts a top and a bottom of said shroud.

33. The fan blade assembly as recited in claim 30, wherein said first turning vane transits said diffuser section along an arcuate path.

34. The fan blade of claim 26 further comprising a second turning vane within said shroud downstream of said first turning vane, said second turning vane turning said airflow within said second axial direction.

35. The fan blade assembly as recited in claim 34, wherein said second turning vane contacts a top and a bottom of said shroud.

36. The fan blade assembly as recited in claim 26, wherein said diffuser section extends radially and axially above an end of said airfoil section.

37. The fan blade as recited in claim 26, wherein the first direction is an axially aft direction, and wherein the second direction is an axially forward direction.

* * * * *